US012785197B2

(12) United States Patent
Barrowclift et al.

(10) Patent No.: US 12,785,197 B2
(45) Date of Patent: Nov. 3, 2026

(54) BATTERY PACK

(71) Applicant: MILWAUKEE ELECTRIC TOOL CORPORATION, Brookfield, WI (US)

(72) Inventors: Michael A. Barrowclift, Milwaukee, WI (US); Kyle C. Fassbender, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 285 days.

(21) Appl. No.: 17/342,946

(22) Filed: Jun. 9, 2021

(65) Prior Publication Data

US 2021/0391623 A1 Dec. 16, 2021

Related U.S. Application Data

(60) Provisional application No. 63/037,710, filed on Jun. 11, 2020.

(51) Int. Cl.

*H01M 50/264* (2021.01)
*H01M 50/213* (2021.01)
*H01M 50/30* (2021.01)
*H01M 50/627* (2021.01)

(52) U.S. Cl.

CPC ....... *H01M 50/264* (2021.01); *H01M 50/213* (2021.01); *H01M 50/394* (2021.01); *H01M 50/627* (2021.01)

(58) Field of Classification Search

CPC ............. H01M 50/213; H01M 50/264; H01M 50/271; H01M 10/643

See application file for complete search history.

(56) References Cited

U.S. PATENT DOCUMENTS

| | | | | |
|---|---|---|---|---|
| 6,379,837 | B1 | 4/2002 | Takahashi et al. | |
| 2011/0293998 | A1 | 12/2011 | Sato et al. | |
| 2012/0183826 | A1 * | 7/2012 | Hermann ........... | H01M 50/213 429/98 |

(Continued)

FOREIGN PATENT DOCUMENTS

| | | |
|---|---|---|
| CN | 205231143 U | 5/2016 |
| CN | 205645915 U | 10/2016 |

(Continued)

OTHER PUBLICATIONS

International Search Report and Written Opinion for Application No. PCT/US2021/036567 dated Sep. 30, 2021 (9 pages).

(Continued)

*Primary Examiner* — Allison Bourke
*Assistant Examiner* — Kayla Elaine Clary
(74) *Attorney, Agent, or Firm* — Michael Best & Friedrich LLP

(57) ABSTRACT

A battery pack includes a frame member. The frame member includes a cell receiving recess, an adhesive introduction port, an adhesive passage, and a ventilation port. The cell receiving recess is able to receive a cell. The adhesive introduction port is able to receive an adhesive therethrough. The adhesive passage extends at least partially about the cell receiving recess. The adhesive passage is in fluid communication with the adhesive introduction port and with the cell receiving recess. The ventilation port is in fluid communication with the adhesive passage.

27 Claims, 16 Drawing Sheets

(56) References Cited

U.S. PATENT DOCUMENTS

| | | | | |
|---|---|---|---|---|
| 2016/0118633 | A1* | 4/2016 | Hongo ................ | H01M 50/507<br>429/121 |
| 2016/0149174 | A1* | 5/2016 | Okura ................ | H01M 50/289<br>429/99 |
| 2020/0076022 | A1* | 3/2020 | Kawakami .......... | H01M 50/581 |
| 2020/0136098 | A1* | 4/2020 | Ringk ................ | H01M 50/107 |

FOREIGN PATENT DOCUMENTS

| | | | | | |
|---|---|---|---|---|---|
| CN | 207116543 | U | | 3/2018 | |
| CN | 110544754 | A | | 12/2019 | |
| CN | 210120169 | U | | 2/2020 | |
| JP | 2012009389 | A | | 1/2012 | |
| JP | 2012243514 | A | * | 12/2012 | |
| JP | 2021522662 | A | * | 1/2021 | ............. B29C 33/10 |
| KR | 1020160063265 | A | | 6/2016 | |
| KR | 101653307 | B1 | | 9/2016 | |

OTHER PUBLICATIONS

Extended European Search Report for Application No. 21821196.9 dated Aug. 9, 2024 (10 pages).

Chinese Patent Office Action for Application No. 202180041242.3 dated Dec. 8, 2025 (22 pages including English translation).

Chinese Patent Office Action for Application No. 202180041242.3 dated May 15, 2026 (25 pages including English translation).

* cited by examiner

BATTERY PACK

CROSS-REFERENCE TO RELATED APPLICATIONS

This application claims priority to U.S. Provisional Patent Application No. 63/037,710, filed on Jun. 11, 2020, the entire contents of which are hereby incorporated by reference herein.

BACKGROUND

The present disclosure relates to battery packs.

SUMMARY

In one aspect, the present disclosure relates to a battery pack having a frame member. The frame member includes a cell receiving recess, an adhesive introduction port, an adhesive passage, and a ventilation port. The cell receiving recess is able to receive a cell. The adhesive introduction port is able to receive an adhesive therethrough. The adhesive passage extends at least partially about the cell receiving recess. The adhesive passage is in fluid communication with the adhesive introduction port and with the cell receiving recess. The ventilation port is in fluid communication with the adhesive passage.

In another aspect, the present disclosure relates to a battery pack having a frame member, a plurality of cells, and adhesive. The frame member includes a plurality of cell receiving recesses, a plurality of adhesive introduction ports, a plurality of adhesive passages, and a plurality of ventilation ports. Each adhesive introduction port corresponds to a respective cell receiving recess. Each adhesive passage extends at least partially about the respective cell receiving recess. Each ventilation port is in fluid communication with a respective adhesive passage. Each cell is received in the respective cell receiving recess. The adhesive is received in each respective adhesive passage. The adhesive contacts each respective cell to couple the cell to the frame member.

Features and aspects of the disclosure will become apparent by consideration of the following detailed description and accompanying drawings.

DETAILED DESCRIPTION

Figure 1:
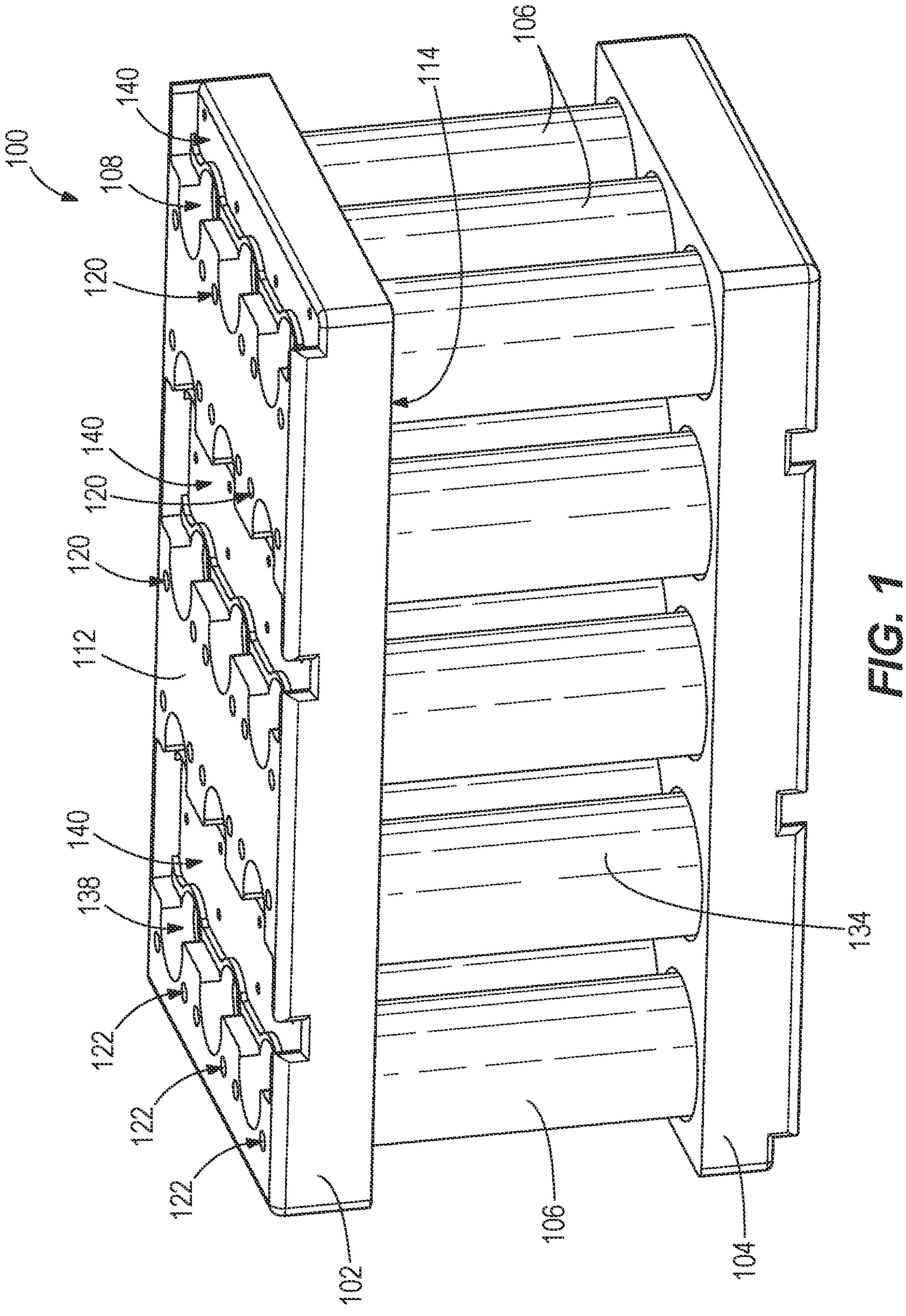
FIG. 1 is a perspective view of a battery pack, according to embodiments disclosed herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

With reference to FIG. 1, an embodiment of a battery pack 100 is shown. The battery pack 100 includes a first frame member 102, a second frame member 104, and a plurality of cells 106. Each of the plurality of cells 106 is coupled to the first frame member 102 and the second frame member 104. As such, the first frame member 102 and the second frame member 104 in the embodiment of the battery pack 100 shown are connected to each other only via the cells 106. In this configuration, at least a portion of the cells 106 may be exposed in a lateral direction. This configuration may provide benefits such as more effective heat transfer removing heat from the cells 106.

Figure 2:
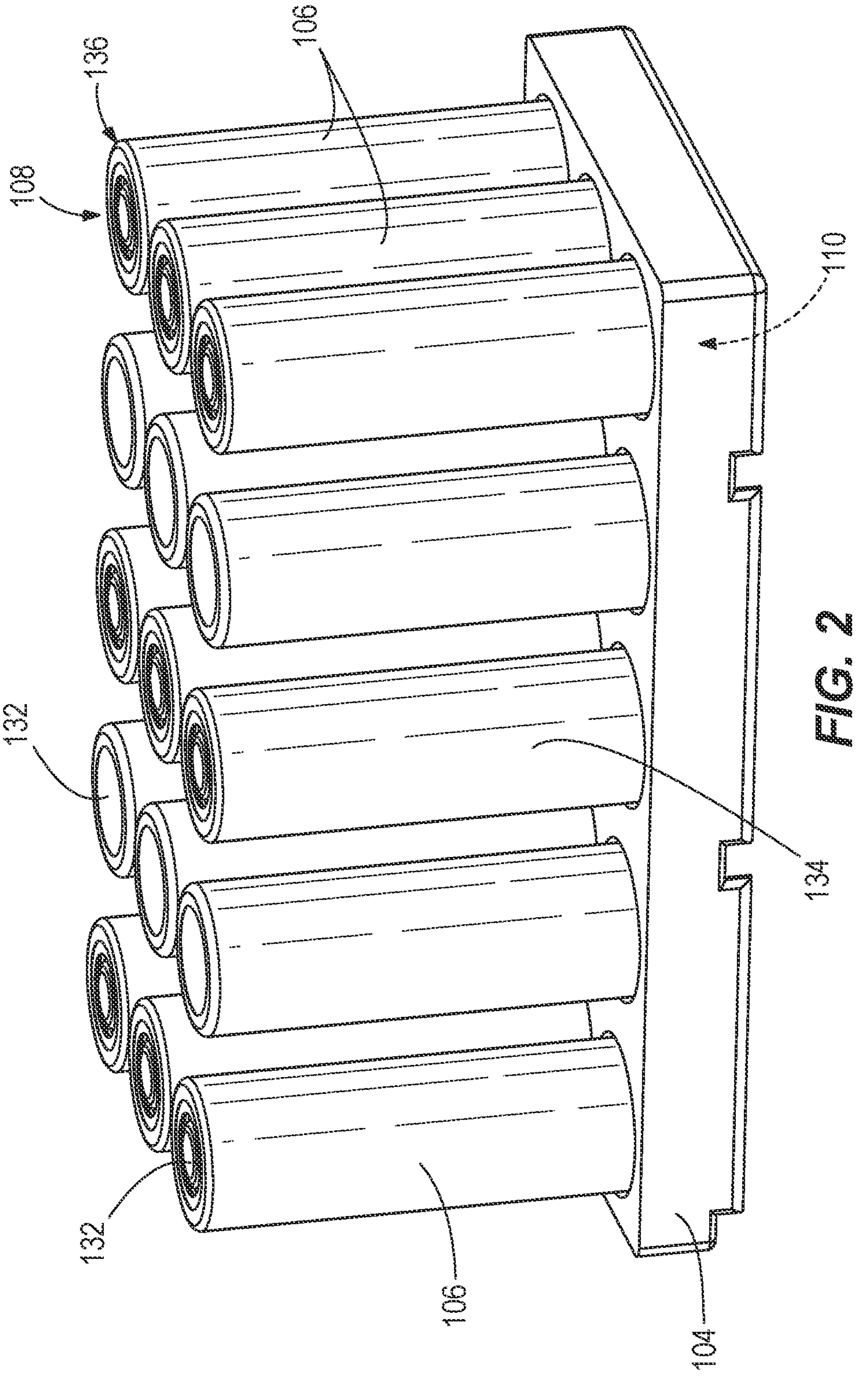
FIG. 2 is a perspective view of the battery pack of FIG. 1 with the first frame member removed.
Figure 3:
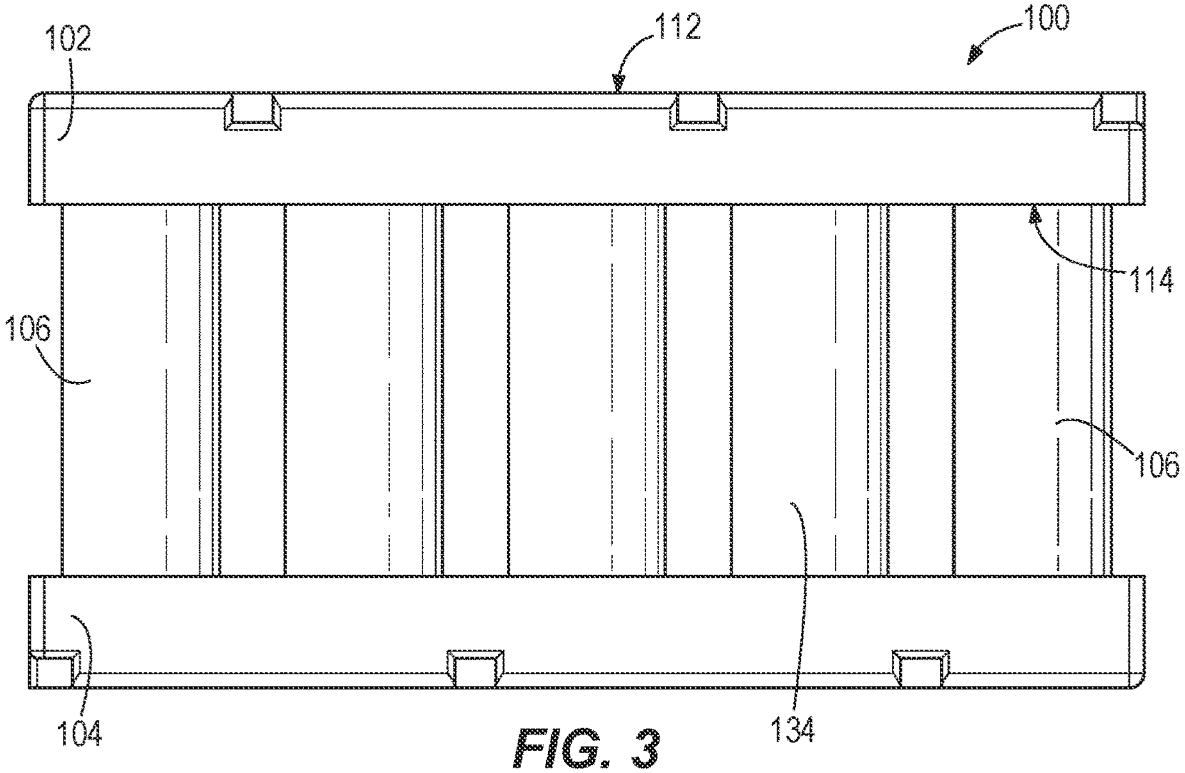
FIG. 3 is a front elevation view of the battery pack of FIG. 1.
Figure 4:
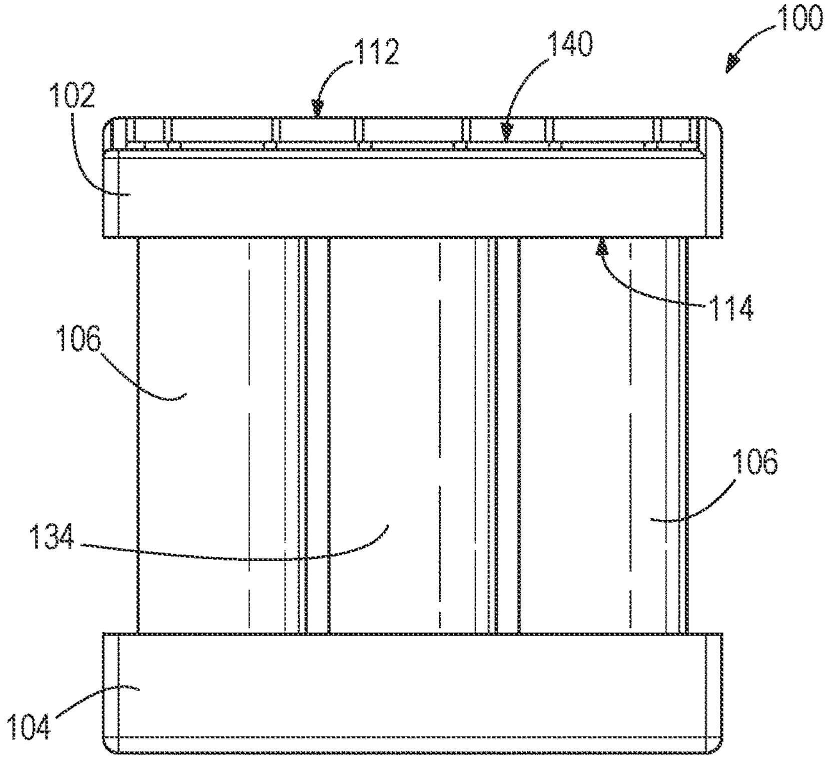
FIG. 4 is a side elevation view of the battery pack of FIG. 1.

As shown in FIG. 2, each cell 106 has a first end 108 that is coupled to the first frame member 102. Each cell 106 also has a second end 110 that is coupled to the second frame member 104. The second ends 110 of the cells 106 are received within the second frame member 104 in FIG. 2. In the illustrated embodiment of the battery pack 100, the second frame member 104 is identical to the first frame member 102. Accordingly, some features described below with regard to the first frame member 102 will not be repeated with regard to the second frame member 104 in the interest of brevity.

Figure 5:
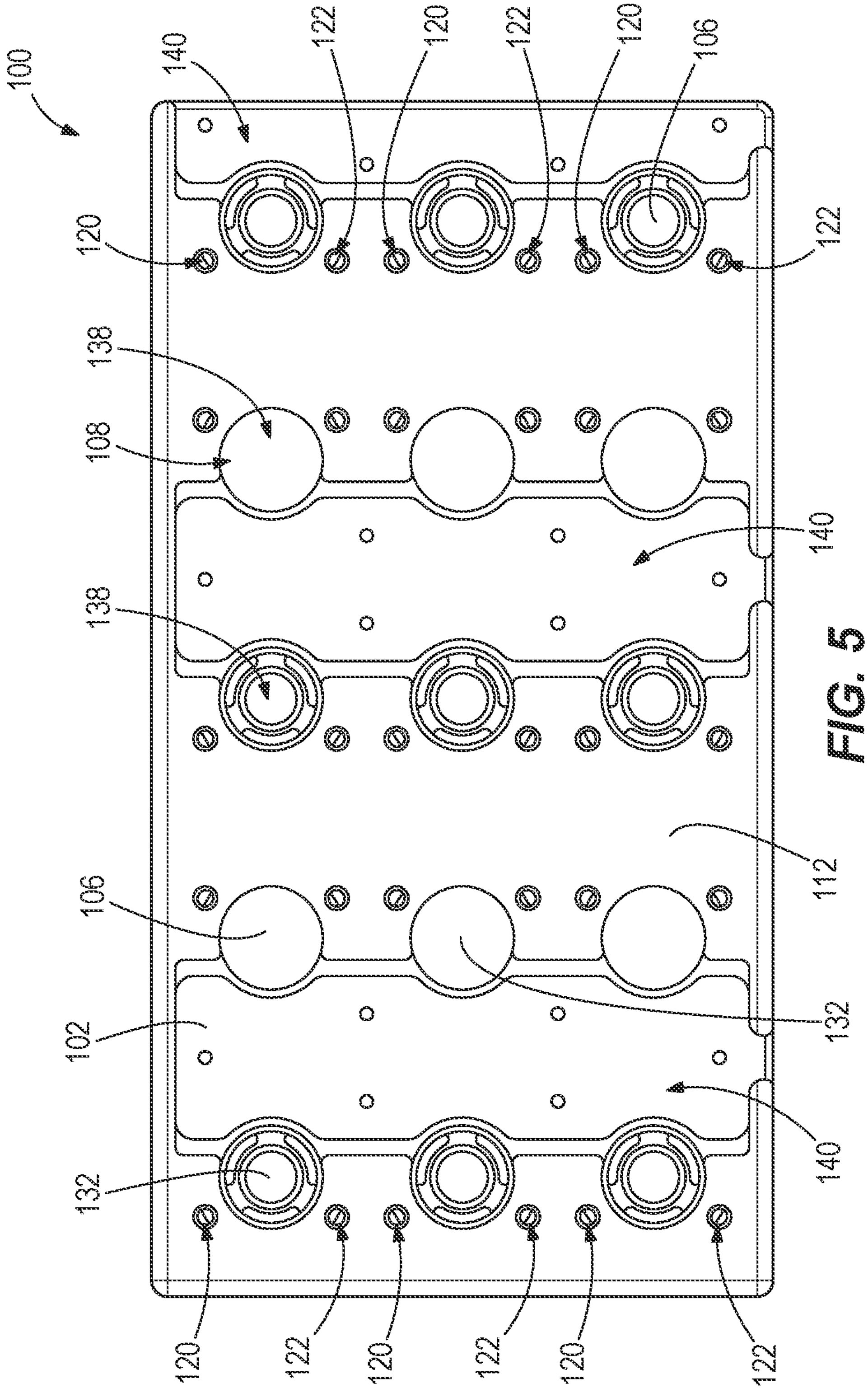
FIG. 5 is a top plan view of the battery pack of FIG. 1.
Figure 6:
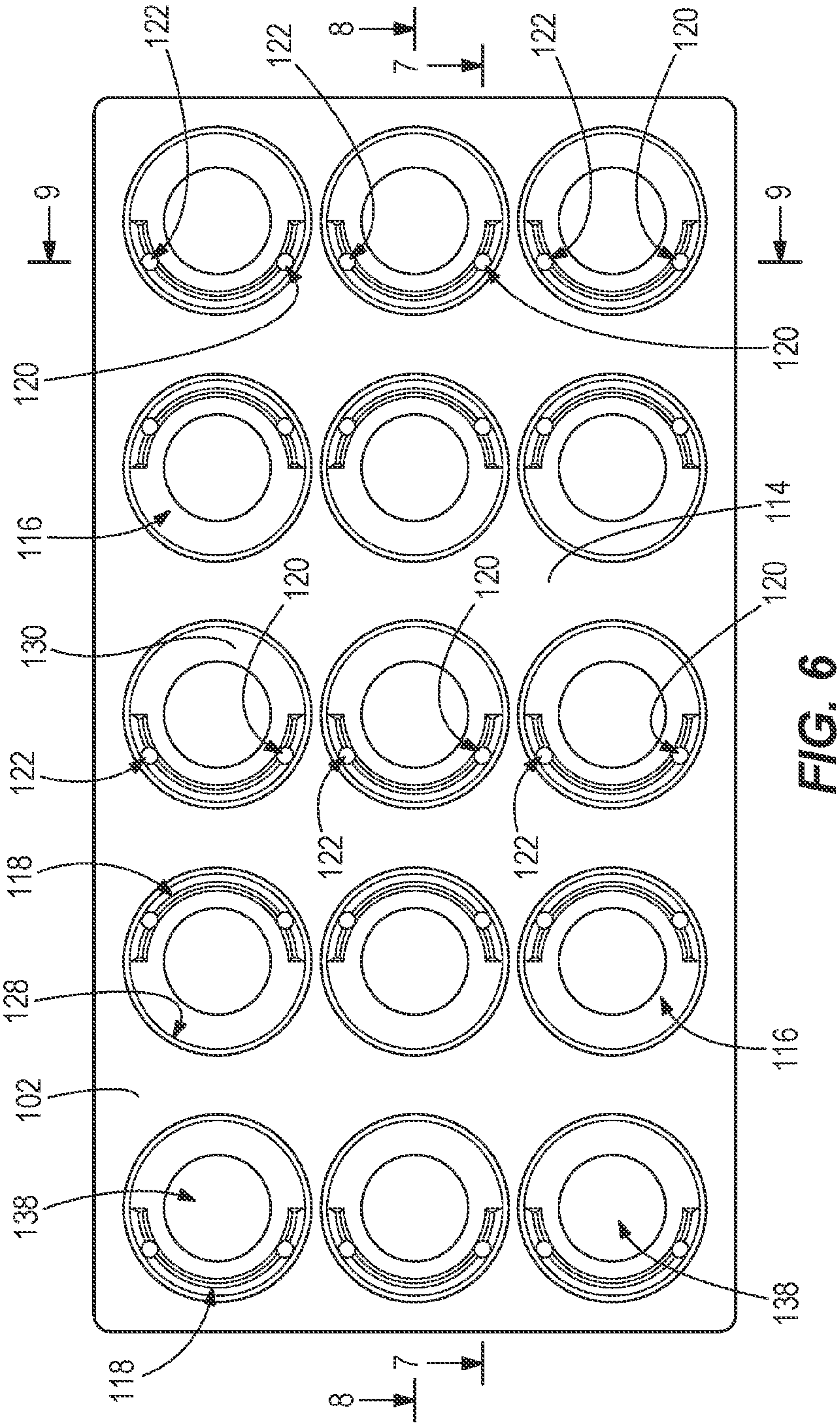
FIG. 6 is a bottom plan view of the first frame member of the battery pack of FIG. 1.

As shown in FIG. 5, the first frame member 102 includes an outer surface 112. With reference to FIG. 6, the first frame member 102 also includes an inner surface 114 that is opposite the outer surface 112. The first frame member 102 has a plurality of cell receiving recesses 116 defined in the inner surface 114. Each cell receiving recess 116 is sized and shaped to receive the first end 108 of a corresponding cell 106.

Shown in FIG. 6, each cell receiving recess 116 further includes an adhesive passage 118 defined in the first frame member 102. In the illustrated embodiment, the adhesive passage 118 is in fluid communication with the cell receiving recess 116. Particularly, the illustrated embodiment includes the adhesive passage 118 having at least one side that is open to the cell receiving recess 116. In this manner, an edge of the cylindrical cell 106 is disposed adjacent the adhesive passage 118 once the cell 106 is coupled to the first frame member 102. This positioning of the cell 106 relative to the adhesive passage 118 allows adhesive to contact both the cell 106 and the first frame member 102, thereby bonding the cell 106 and the first frame member 102 together. As shown in FIG. 6, each adhesive passage 118 extends at least partially about the corresponding cell receiving recess 116. In the particular embodiment shown in FIG. 6, the adhesive passage 118 is illustrated as a semiannular passage. Other embodiments contemplated herein, however, may include one or more adhesive passages 118 that are annular passages extending entirely about the corresponding cell receiving recesses 116.

With reference to both FIGS. 5 and 6, the first frame member 102 further includes an adhesive introduction port 120 defined therein. The adhesive introduction port 120 is defined in the outer surface 112 of the first frame member 102 and extends through the first frame member 102 to communicate with the adhesive passage 118. A user or machine can introduce adhesive through the adhesive introduction port 120 in order to fill the adhesive passage 118 with adhesive, thereby coupling the first frame member 102 to a corresponding cell 106.

With continued reference to both FIGS. 5 and 6, the first frame member 102 also includes a ventilation port 122 defined therein. The ventilation port 122 is also defined in the outer surface 112 of the first frame member 102 and also extends through the first frame member 102 to communicate with the adhesive passage 118. The ventilation port 122 allows air to escape the adhesive passage 118 as the adhesive passage 118 is filled with adhesive. Further, the ventilation port 122 may provide visual confirmation of adequate filling of the adhesive passage 118 with adhesive.

As shown in FIG. 6, neither the adhesive introduction port 120 nor the ventilation port 122 need be adjacent an end of the adhesive passage 118, although some embodiments may include such a configuration. Both the adhesive introduction port 120 and the ventilation port 122 extend through the first frame member 102 in a direction that is generally perpendicular to the length of the adhesive passage 118.

Figure 7:
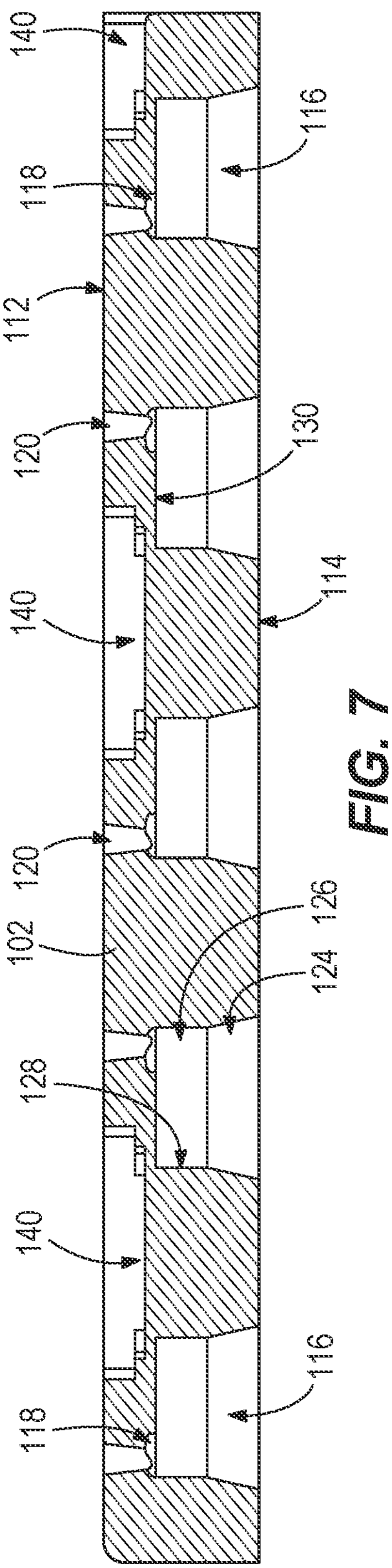
FIG. 7 is a front cross-sectional elevation view of the first frame member of FIG. 6 taken along line 7-7.

With reference to FIG. 7, each cell receiving recess 116 includes a frustoconical section 124 and a cylindrical section 126. The frustoconical section 124 of the cell receiving recess 116 is defined in the inner surface 114 of the first frame member 102. This configuration may ease installation of the cells 106 in the respective cell receiving recesses 116.

As shown in FIG. 7, the frustoconical section 124 narrows to meet the cylindrical section 126 of each cell receiving recess 116. The cylindrical section 126 of each cell receiving recess 116 may be sized such that a desired fit between the first frame member 102 and the cell 106 is achieved. This fit may depend on the viscosity of the adhesive, but may be, for instance, a transition fit or an interference fit. Many embodiments provide significant flow resistance due to the fit between the cell 106 and the sidewall 128 of the cylindrical section 126 such that little to no adhesive passes through the cylindrical section 126 beyond the inner surface 114 of the first frame member 102.

Also shown in FIG. 7, the illustrated embodiment further includes the adhesive introduction port 120 having a frustoconical shape. This configuration may ease installation of an adhesive injection nozzle into the adhesive introduction port 120, whether the adhesive injection nozzle is moved by a user manually or by robotic machinery. In the illustrated embodiment, the adhesive introduction port 120 meets and communicates with the adhesive passage 118 at a bottom end of the adhesive introduction port 120. Stated another way, the illustrated embodiment includes the adhesive introduction port 120 extending between the outer surface 112 of the first frame member 102 and the surface of the adhesive passage 118 that is nearest the outer surface 112 of the first frame member 102. This configuration may allow for the shortest possible adhesive introduction port 120 to aid adhesive flow into and through the adhesive passage 118.

Figure 8:
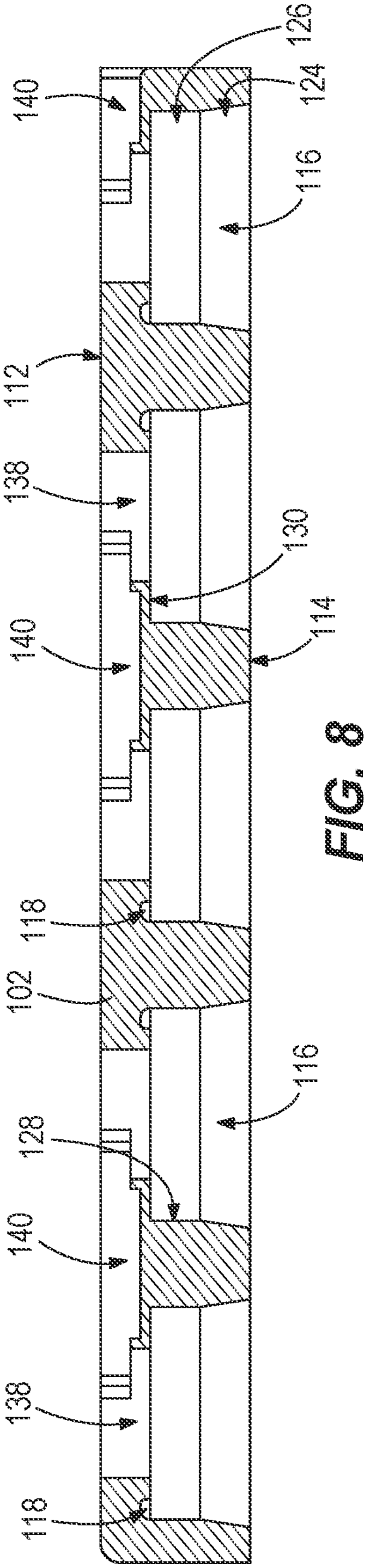
FIG. 8 is a front cross-sectional elevation view of the first frame member of FIG. 6 taken along line 8-8.

Turning now to FIG. 8, a cross-section of the adhesive passage 118 between the adhesive introduction port 120 and the ventilation port 122 is shown. In the illustrated embodiment, the adhesive passage 118 is defined in a recess end surface 130 of the cylindrical section 126 of the cell receiving recess 116, which receives and retains a portion of the corresponding cell 106. In such embodiments, adhesive in the adhesive passage 118 may contact only a cell end surface 132 of a corresponding cell 106, or the adhesive in the adhesive passage 118 may contact both the cell end surface 132 and a portion of the lateral surface 134 of the corresponding cell 106 (both surfaces 132, 134 are best shown in FIG. 2). In some embodiments, the adhesive passage 118 is defined in both the sidewall 128 and the recess end surface 130 of the cylindrical section 126 such that an edge 136 of the corresponding cell 106 (best shown in FIG. 2) is at least partially disposed in the adhesive passage 118 and both the cell end surface 132 and the lateral surface 134 receive adhesive thereon. Also shown in the illustrated embodiment, the adhesive passage 118 is wider radially inward and narrower radially outward as the adhesive passage 118 approaches the sidewall 128 of the cylindrical section 126. In some embodiments, this configuration may aid in directing the adhesive such that little to no adhesive travels along the sidewall 128 between the sidewall 128 and the cell 106.

Figure 9:
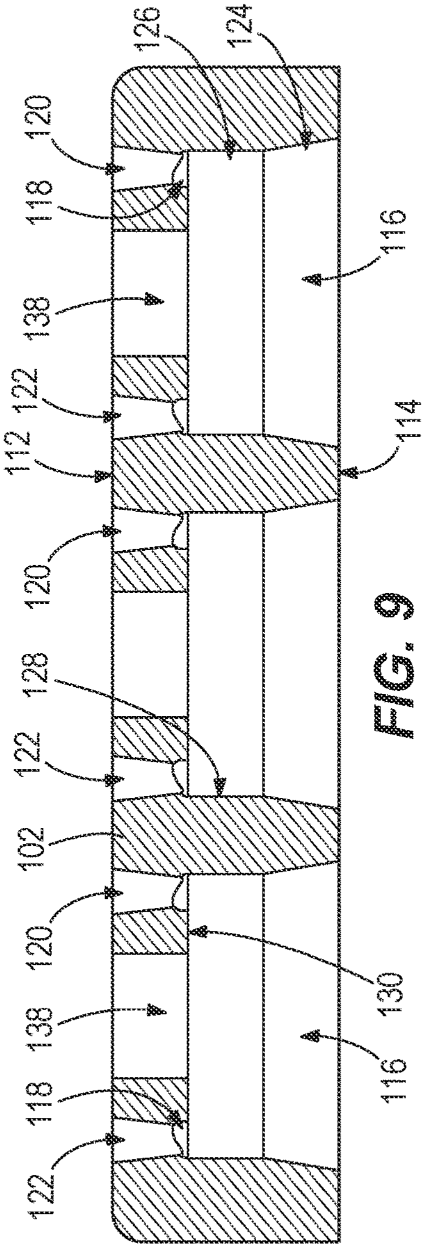
FIG. 9 is a side cross-sectional elevation view of the first frame member of FIG. 6 taken along line 9-9.

As shown in FIG. 9, the ventilation port 122 also has a frustoconical shape in the illustrated embodiment. The ventilation port 122 meets and communicates with the adhesive passage 118 at a bottom end of the ventilation port 122. Stated another way, the illustrated embodiment includes the ventilation port 122 extending between the outer surface 112 of the first frame member 102 and the surface of the adhesive passage 118 that is nearest the outer surface 112 of the first frame member 102. This configuration may allow for the adhesive passage 118 to become full of adhesive prior to filling the ventilation port 122.

Also shown in FIG. 9, each of the adhesive introduction port 120 and the ventilation port 122 meet the adhesive passage 118 at an incline in the illustrated embodiment. In some embodiments, this configuration further allows for adhesive to be directed such that little to no adhesive travels along the sidewall 128 between the sidewall 128 and the cell 106 toward the inner surface 114 of the first frame member 102. The ventilation port 122 and the adhesive introduction port 120 are illustrated as being identical, which may allow a user to introduce adhesive in one or the other of the two ports 120, 122 without risk of picking the wrong port.

Figure 8A:
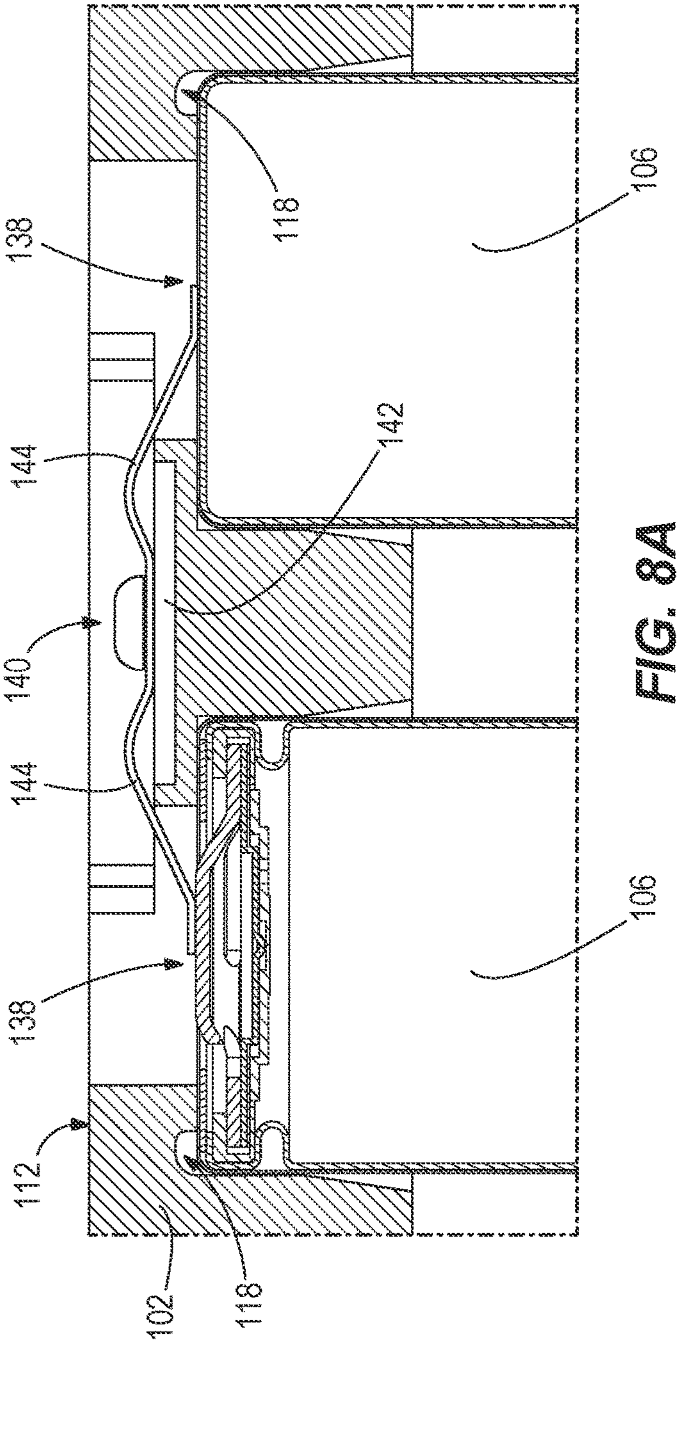
FIG. 8A is a detailed front cross-sectional elevation view of the first frame member of FIG. 8, but with cells, a metal connector strap, and wires disposed in the first frame member.

As can be seen in FIGS. 8, 8A, and 9, the battery pack 100 may further include a plurality of through holes 138 defined in each of the frame members 102, 104. Each through hole 138 communicates the outer surface 112 of the respective frame member 102, 104 with the corresponding cell receiving recess 116 defined in the inner surface 114 of the respective frame member 102, 104. In this manner, at least a portion of each end 108, 110 of the respective cell 106 is accessible from the outer surface 112 of each of the frame members 102, 104 (as shown best in FIG. 5).

As shown in FIGS. 1 and 5, each of the frame members 102, 104 further includes at least one strap recess 140 defined in the outer surface 112 of each frame member 102, 104. Each strap recess 140 is adjacent to and in fluid communication with a plurality of the through holes 138.

As shown particularly in FIG. 8A, this configuration allows for a metal connector strap 142 to be placed in the strap recess 140. In some embodiments, the metal connector strap (e.g., a busbar) 142 is permanently affixed to the respective frame member 102, 104 in the strap recess 140 with one or more fasteners, adhesive, or the like. A plurality of wires 144 are welded to the metal connector strap 142 and corresponding cells 106 at the ends 108, 110 of the cells 106. The wires 144 pass through the through holes 138 in order to reach the respective ends 108, 110 of the cells 106. This welded wire configuration is also known as a wire-bonded battery pack 100. The strap recesses 140 of the illustrated battery pack 100 allow for the metal connector strap 142 and the welded wires 144 to be positioned below the outer surface 112 of the respective frame members 102, 104. This arrangement allows for a degree of protection of the metal connector strap 142 and the wires 144 from damage due to, for instance, dropping the battery pack 100. In some embodiments, one or more covers (not shown) are coupled to the outer surface 112 of each of the respective frame members 102, 104 to then cover the metal connector strap 142 and the wires 144, thereby further protecting these components.

The use of the adhesive coupling the cells 106 to the frame members 102, 104 allows for a more stable battery pack 100 assembly. Due to the resistance to separation of the components of the battery pack 100, the welded wire interfaces are less likely to separate, and the wires 144 themselves are less likely to break. Stated another way, the cells 106 do not move relative to the frame members 102, 104 (or at least move relatively little). This little to no movement allows for a more stable and longer lasting wire-bonded battery pack 100. The relatively static relationship between the cells 106 and the frame members 102, 104 after the application and curing of the adhesive also allows for an easier wire-bonding application process.

Figure 10:
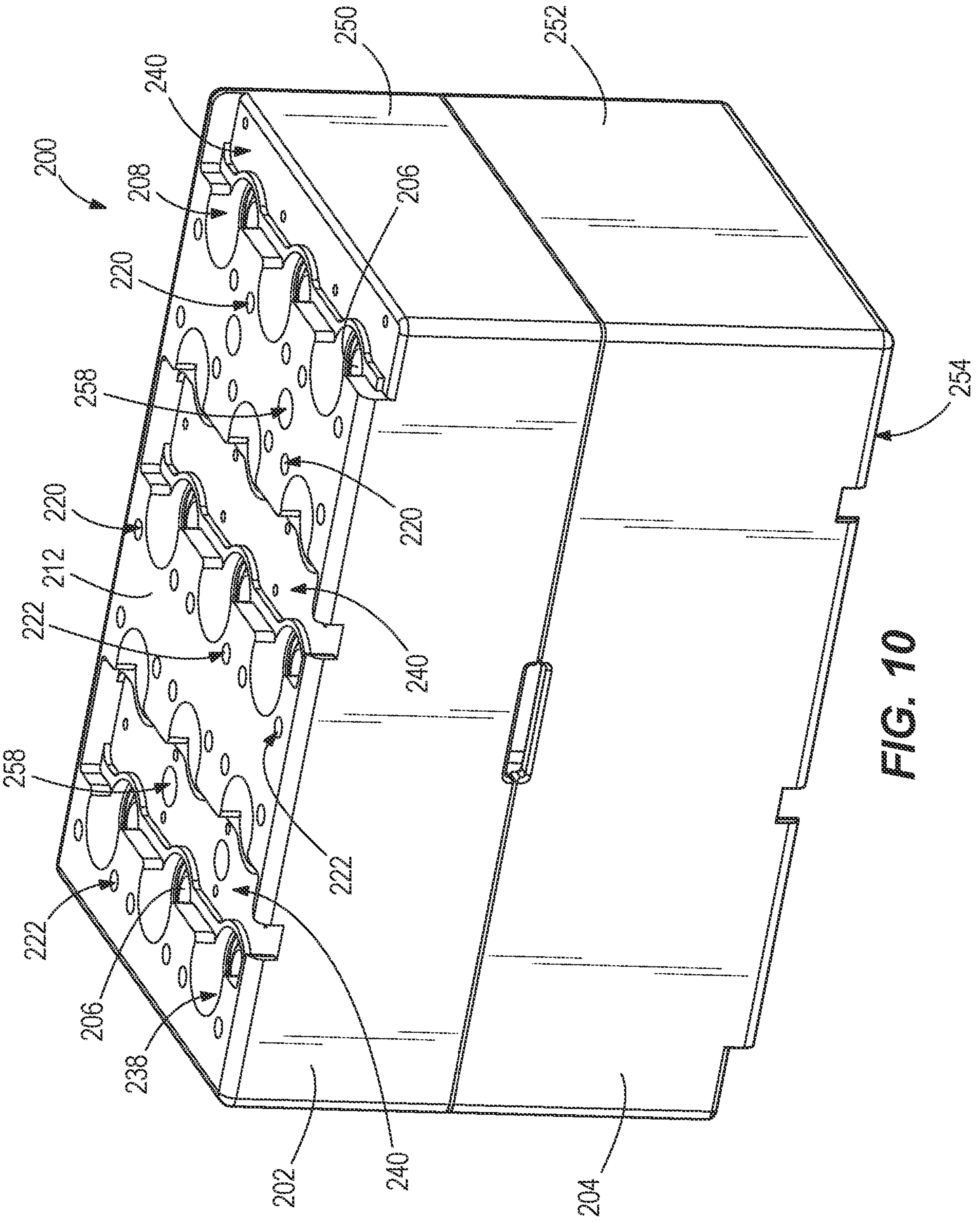
FIG. 10 is a perspective view of a battery pack, according to embodiments disclosed herein.

With reference to FIG. 10, another embodiment of a battery pack 200 is shown. The battery pack 200 is similar in many ways to the battery pack 100 discussed above. As such, many features that are similar to those discussed above with regard to the battery pack 100 will not be repeated here in the interest of brevity. Such features will be given a number that is a value of one hundred higher than the corresponding similar feature discussed above with regard to the battery pack 100. The differences between the battery packs 100, 200 will be discussed below.

As shown in FIG. 10, the first frame member 202 and the second frame member 204 are not identical, though they could be in some embodiments. The first frame member 202 has a first sidewall 250 that extends from the first outer surface 112 of the first frame member 202. The second frame member 204 has a second sidewall 252 that extends from the second outer surface 254 of the second frame member 204. In the illustrated embodiment, the first sidewall 250 and the second sidewall 252 meet to enclose a majority of the cells 206. In some embodiments, the sidewalls 250, 252 may meet and completely enclose the cells 206 in a lateral direction of the cells 206. The illustrated embodiment includes the first sidewall 250 being shorter than the second sidewall 252, although other embodiments may include sidewalls 250, 252 that are equal in length (in the axial direction of the cells 206).

Figure 11:
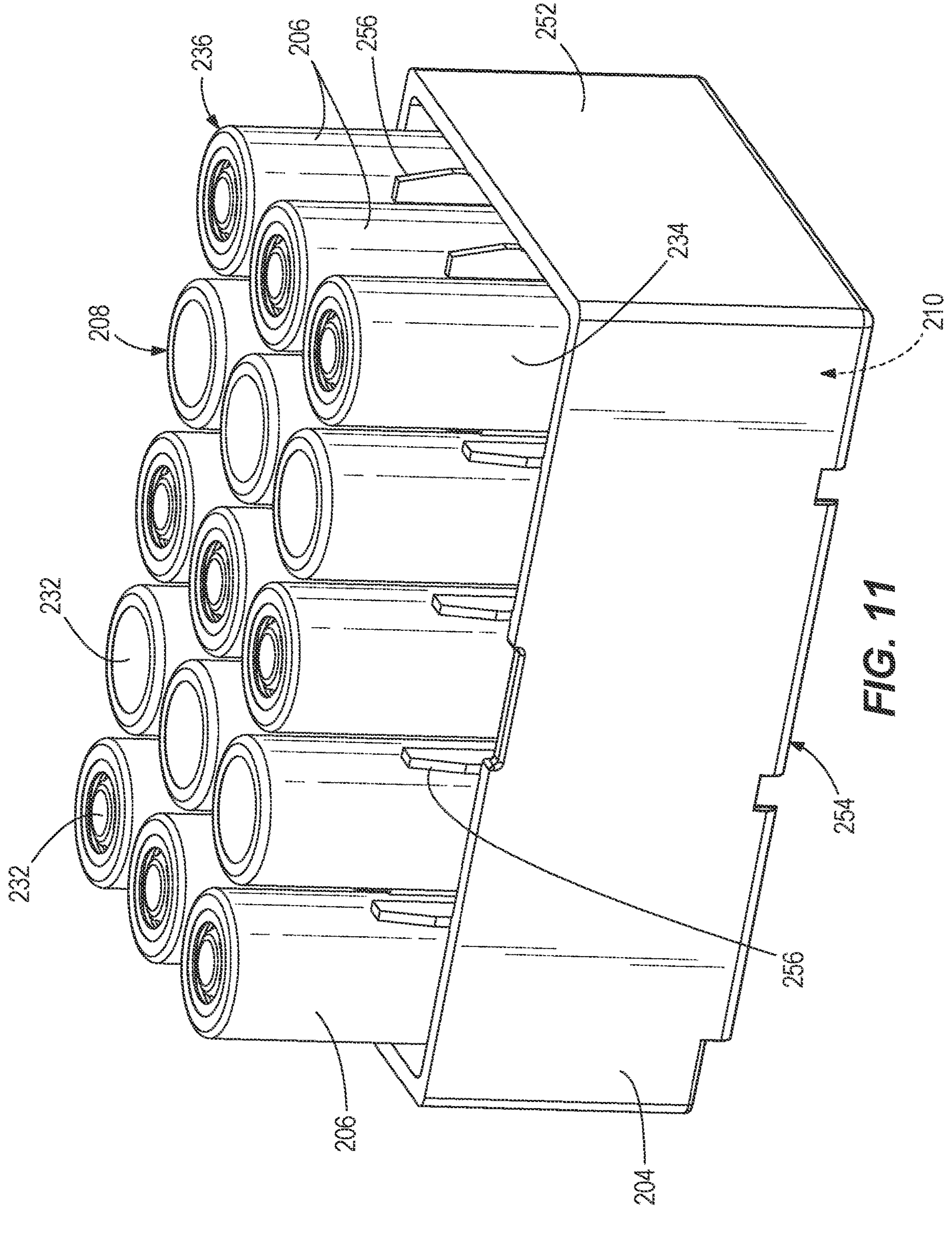
FIG. 11 is a perspective view of the battery pack of FIG. 10 with the first frame member removed.
Figure 12:
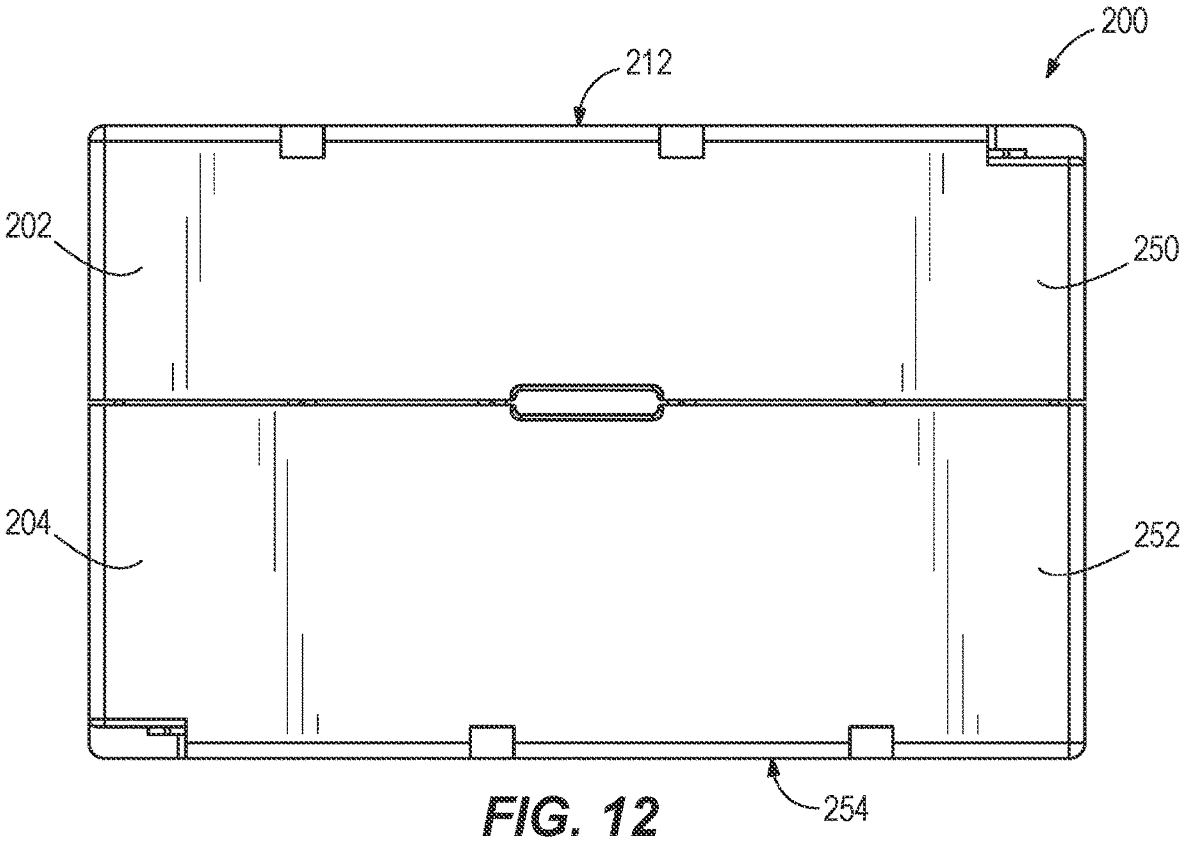
FIG. 12 is a front elevation view of the battery pack of FIG. 10.
Figure 13:
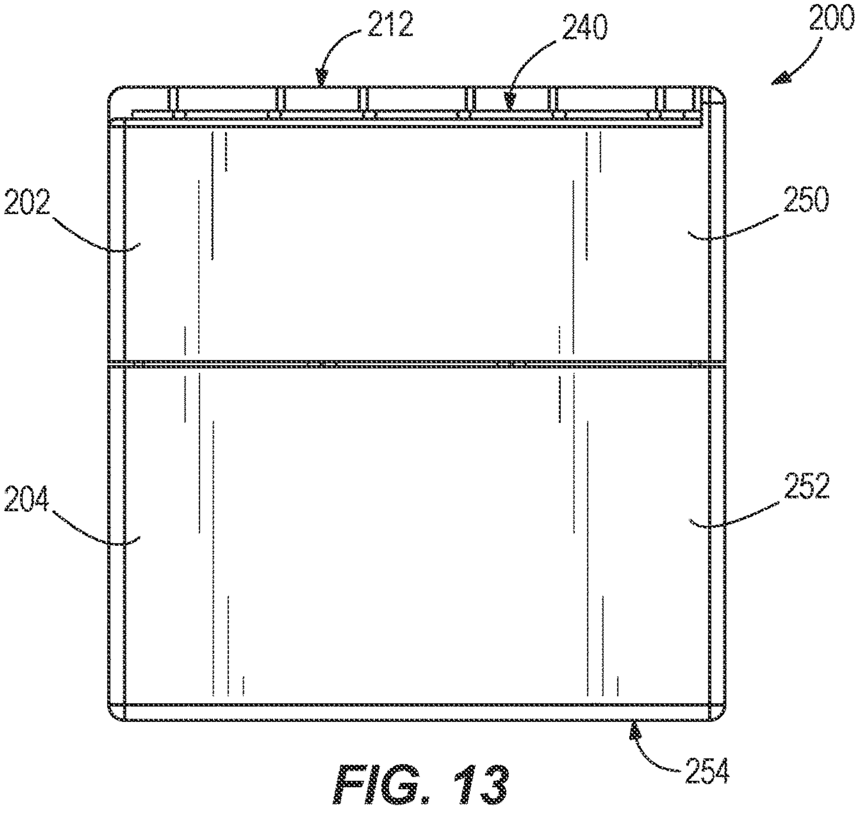
FIG. 13 is a side elevation view of the battery pack of FIG. 10.

In FIG. 11, the illustrated embodiment includes the second frame member 204 having a plurality of second positioning projections 256. These second positioning projections 256 may ease installation of the first frame member 202 into contact with the second frame member 204. The second positioning projections 256 are sloped on the outer edge such that the first sidewall 250 of the first frame member 202 may engage and be directed by the second positioning projections 256. In some embodiments, the second positioning projections 256 may also serve to position and/or stabilize the cells 206, whether the entire battery pack 200 is fully assembled or whether only the second frame member 204 is coupled with the cells 206.

Figure 14:
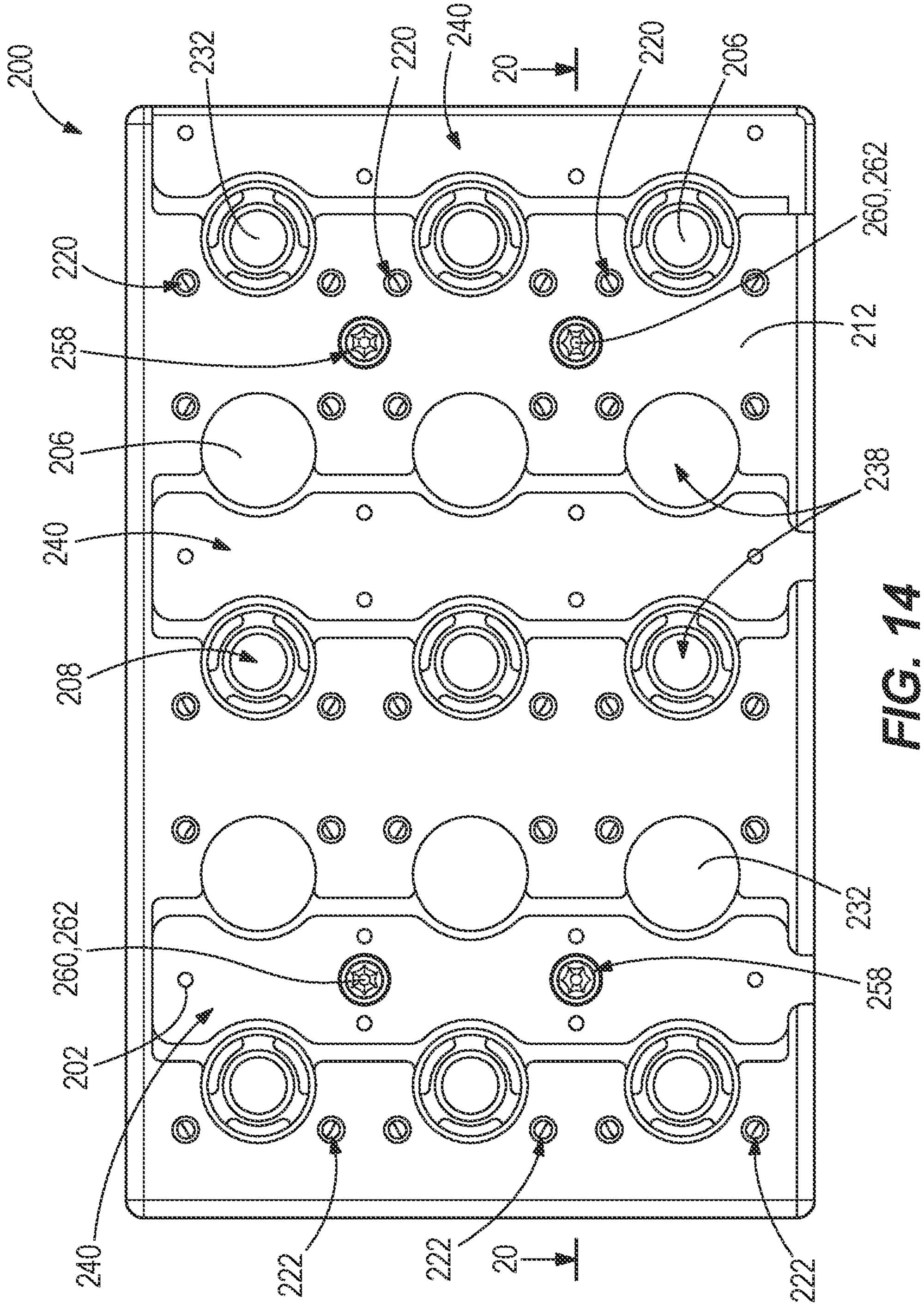
FIG. 14 is a top plan view of the battery pack of FIG. 10.

With reference to FIG. 14, the first frame member 202 includes at least one first fastener opening 258 defined therein. The first fastener opening 258 may be sized to receive a head 260 of a fastener 262 (such as a bolt or a screw, for instance) in a countersunk position. Stated another way, the first fastener opening 258 may have a diameter that is wide enough to accommodate the head 260 of the fastener 262 such that the head 260 of the fastener 262 is disposed recessed relative to the outer surface 212 of the first frame member 202.

Figure 15:
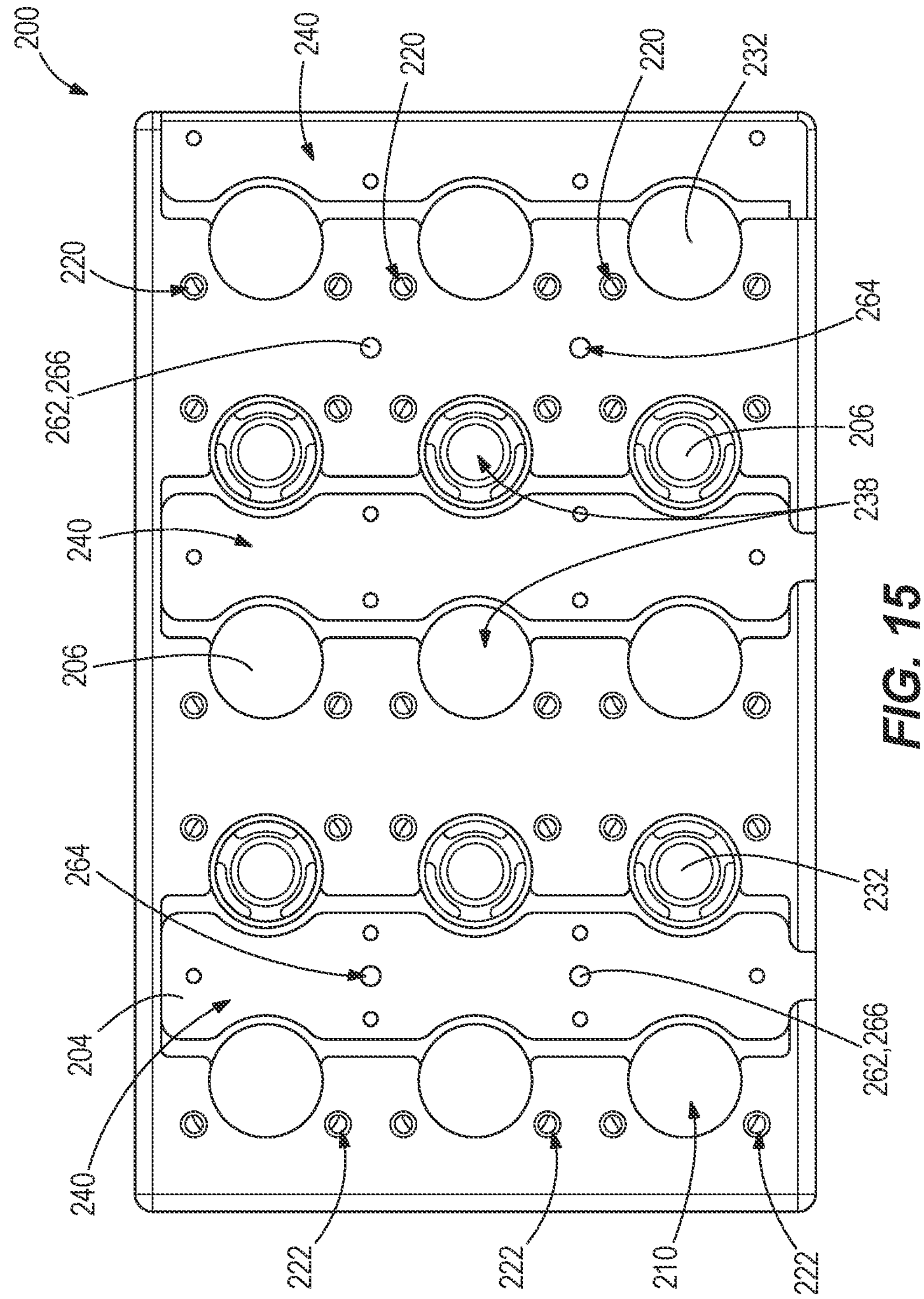
FIG. 15 is a bottom plan view of the battery pack of FIG. 10.
Figure 16:
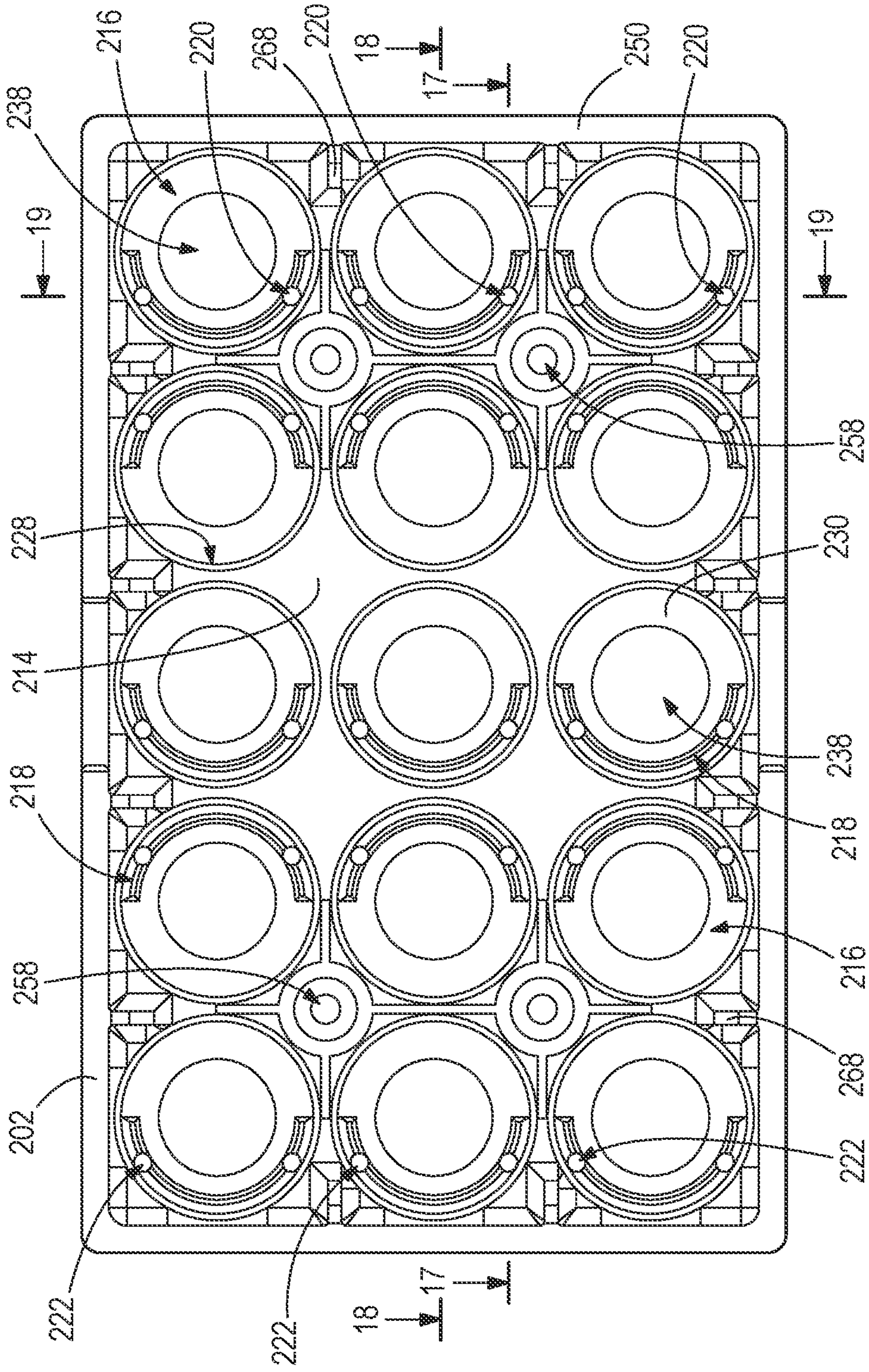
FIG. 16 is a bottom plan view of the first frame member of the battery pack of FIG. 10.

As shown in FIG. 15, the second frame member 204 also includes at least one second fastener opening 264 defined therein. Although the second fastener opening 264 may be identical in shape and size to the first fastener opening 258 in some embodiments, the illustrated embodiment includes a second fastener opening 264 that is only large enough to receive a threaded portion 266 of the fastener 262. Also, although the illustrated embodiment includes the second fastener opening 264 in the form of a through-hole, some embodiments may instead include a second fastener opening 264 in the form of a recess. In such embodiments, the second fastener opening 264 would end short of the second outer surface 254 and not be defined in the second outer surface 254.

Figure 17:
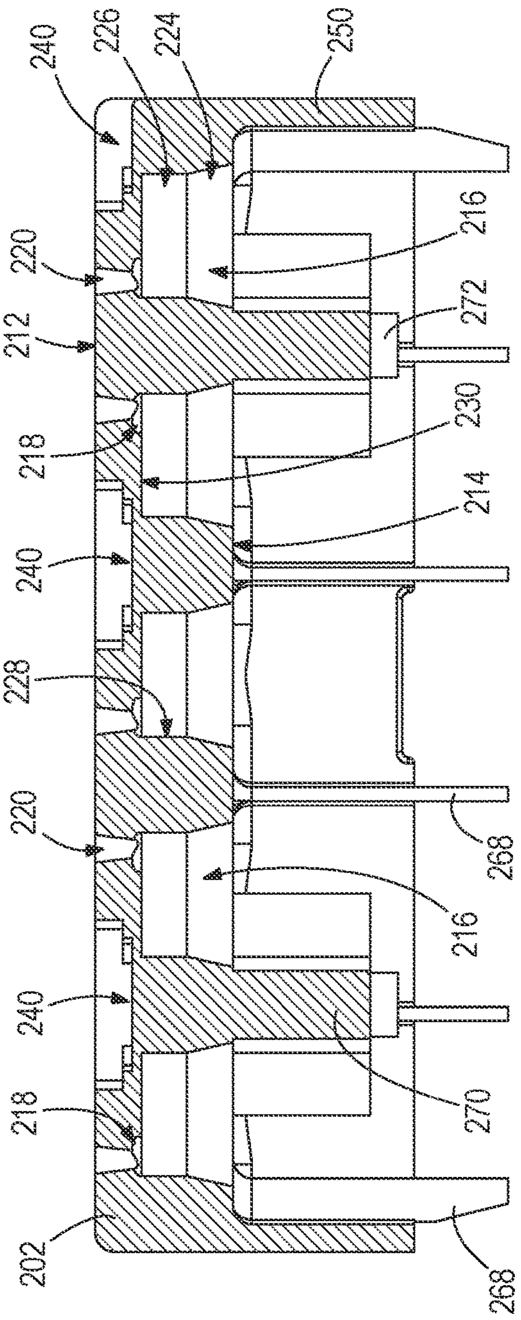
FIG. 17 is a front cross-sectional elevation view of the first frame member of FIG. 16 taken along line 17-17.
Figure 18:
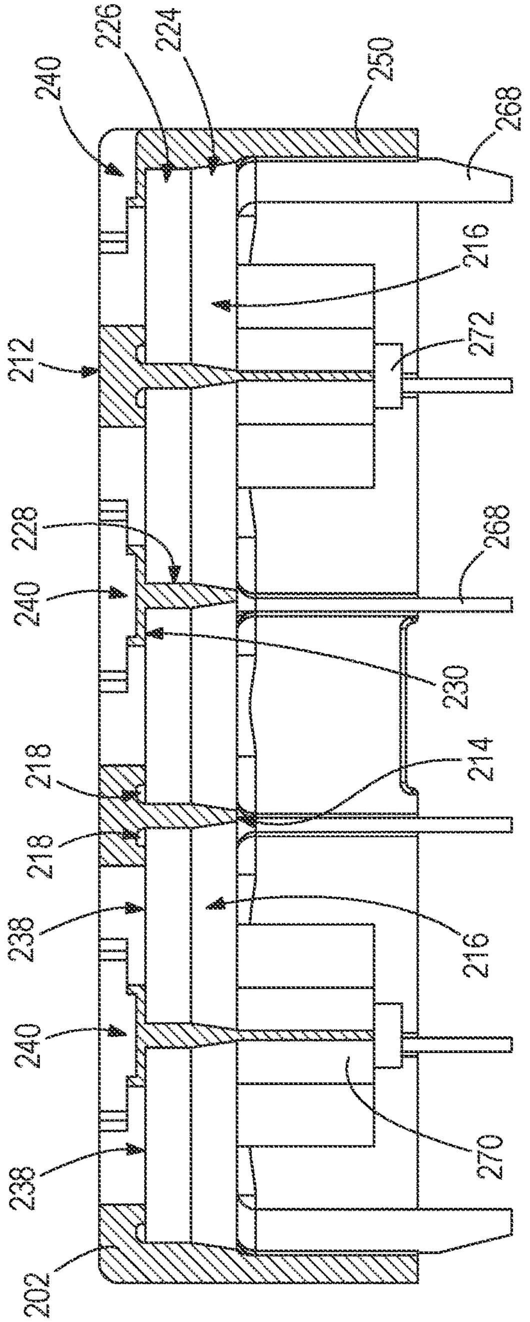
FIG. 18 is a front cross-sectional elevation view of the first frame member of FIG. 16 taken along line 18-18.
Figure 19:
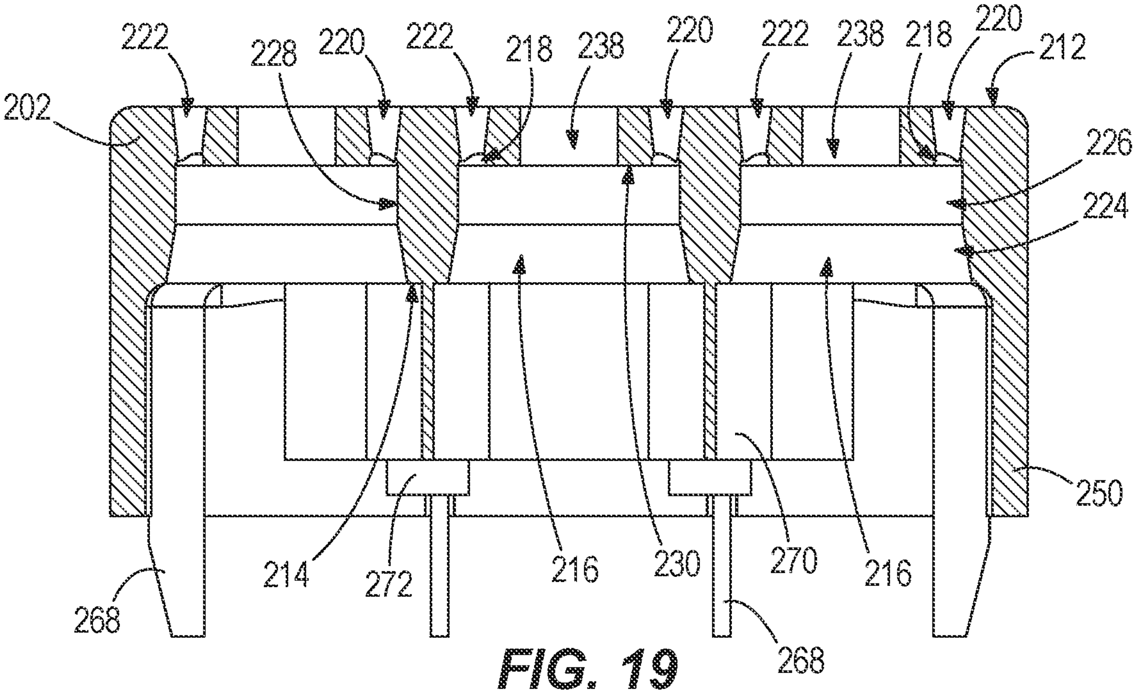
FIG. 19 is a side cross-sectional elevation view of the first frame member of FIG. 16 taken along line 19-19.

Turning now to FIG. 17, the first frame member 202 also includes a plurality of first positioning projections 268. The first positioning projections 268 may be substantially identical to the second positioning projections 256 described above. In the illustrated embodiment, the first positioning projections 268 are located such that each first positioning projection 268 rests adjacent to (or spaced from, in some embodiments) a corresponding second positioning projection 256. This configuration allows the positioning projections 256, 268 to engage the corresponding sidewall 250, 252 without interfering with each other.

With further reference to FIG. 17, the first frame member 202 further includes at least one first boss 270 surrounding the corresponding first fastener opening 258. The first boss 270 extends from the inner surface 214 of the first frame member 202. In some embodiments, the first boss 270 serves to guide the fastener 262. In some embodiments, the first boss 270 further serves to protect the cells 206 from the fastener 262. The illustrated embodiment further includes the first boss 270 having a male end 272.

Figure 20:
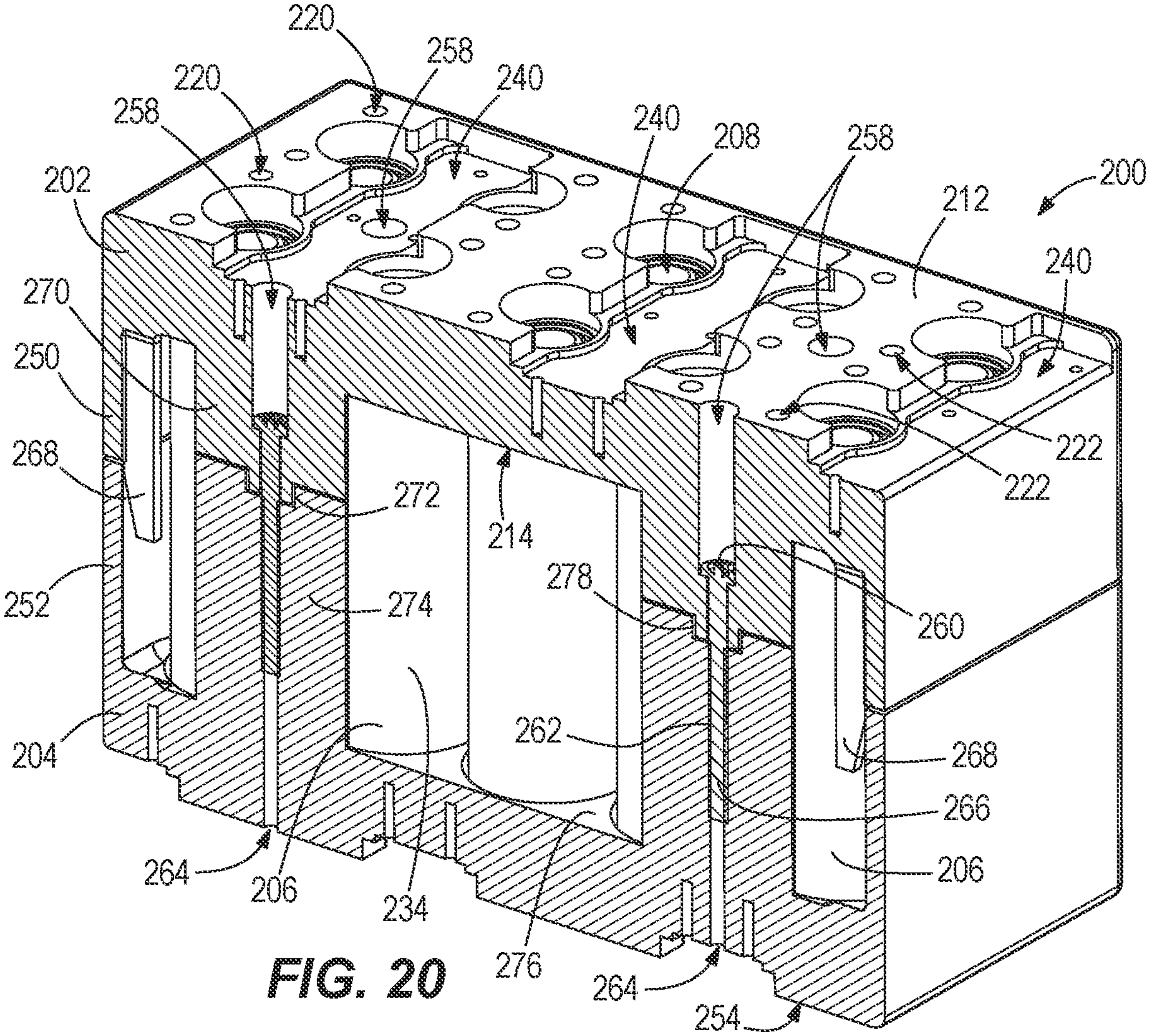
FIG. 20 is a perspective cross-sectional view of the battery pack of FIG. 10.
Figure 21:
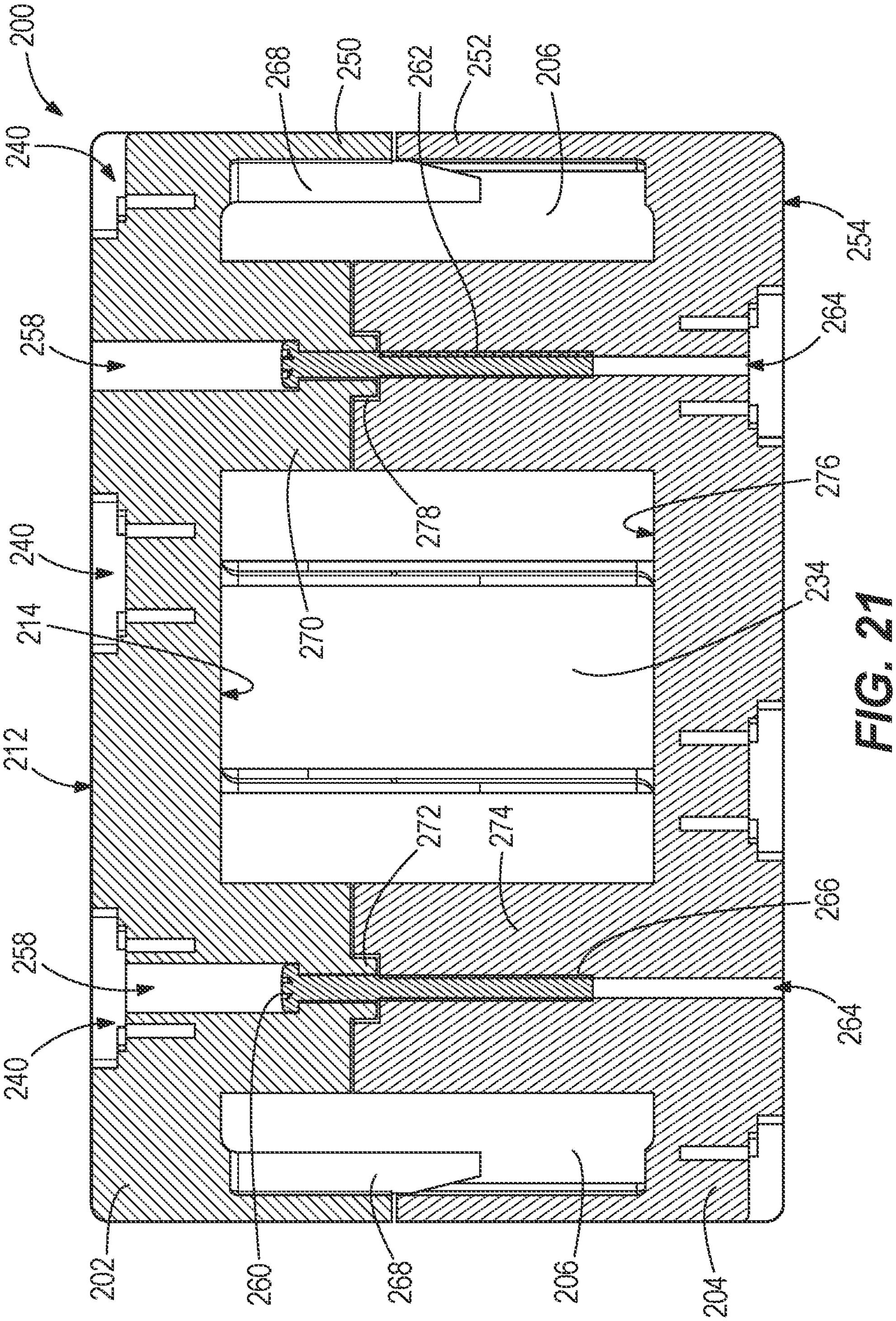
FIG. 21 is a front cross-sectional elevation view of the battery pack of FIG. 10.

As shown in FIG. 20, the second frame member 204 also further includes at least one second boss 274 surrounding the corresponding second fastener opening 264. The second boss 274 extends from the inner surface 276 of the second frame member 204. The illustrated embodiment further includes the second boss 274 having a female end 278. The female end 278 is sized and shaped to receive the male end 272 of the corresponding first boss 270. In some embodiments, the first boss 270 has a female end and the second boss 274 has a male end. In still other embodiments, the bosses 270, 274 have some other complementary interface to aid in locating the first frame member 202 and second frame member 204 relative to each other for assembly.

In some embodiments, the discrete adhesive introduction ports 120, 220 are configured to receive a nozzle of an adhesive gun successively. In other embodiments, however, the discrete adhesive introduction ports 120, 220 are configured to receive adhesive simultaneously through an adhesive injection nozzle manifold. Such embodiments may lend themselves to faster assembly times and ease of assembly.

Although various embodiments have been disclosed herein, still other embodiments are considered to be contemplated in this disclosure. For instance, instead of having discrete adhesive introduction ports 120, 220, some embodiments may include a common adhesive injection site for a plurality of cells 106, 206. In such embodiments, a plurality of adhesive passages 118, 218 are in fluid communication with each other, for instance, via a channel manifold defined in the frame member 102, 202, to form a single adhesive passage that at least partially surrounds a plurality of cell receiving recesses 116, 216. Such embodiments may lend themselves to faster assembly times and ease of assembly. In some embodiments, the ventilation ports 122, 222 may still be provided to allow for ventilation and indication of a full adhesive passage. In some embodiments, however, only one ventilation port 122, 222 may be provided.

Various features of the disclosure are set forth in the following claims.

What is claimed is:

1. A battery pack comprising:

a frame member including a first cell receiving recess configured to receive a cell end surface of a first cell, the first cell receiving recess defining a first central axis and a sidewall configured to contact a cell side surface of the first cell;

a second cell receiving recess configured to receive a cell end surface of a second cell, the second cell receiving recess defining a second central axis;

a third cell receiving recess configured to receive a cell end surface of a third cell, the third cell receiving recess defining a third central axis;

an adhesive introduction port configured to receive an adhesive therethrough;

an adhesive passage extending at least partially about the first cell receiving recess and having a laterally outermost boundary matching with the sidewall of the first cell receiving recess at a common point, the adhesive passage in fluid communication with the adhesive introduction port and with the first cell receiving recess, the adhesive passage configured to introduce adhesive onto the cell end surface of the first cell;

a ventilation port in fluid communication with the adhesive passage; and a strap recess configured to receive a connector strap, the strap recess positioned at least partially between the first central axis, the second central axis, and the third central axis, at least a portion of the strap recess positioned outside of a projected perimeter of each of the first, second, and third cells, the strap recess spanning a distance between the projected perimeter of the first cell and the projected perimeter of the second cell and spanning a distance between the projected perimeter of the first cell and the projected perimeter of the third cell.

2. The battery pack of claim 1, wherein the adhesive passage is an annular passage having at least one side open to the first cell receiving recess.

3. The battery pack of claim 1, wherein the adhesive passage is a semiannular passage having at least one side open to the first cell receiving recess.

4. The battery pack of claim 1, wherein the frame member further includes an outer surface and an inner surface opposite the outer surface, the first cell receiving recess is defined in the inner surface of the frame member, the adhesive introduction port is defined in the outer surface of the frame member, and the ventilation port is defined in the outer surface of the frame member.

5. The battery pack of claim 1, wherein the frame member is designated as a first frame member, and the battery pack further includes a first cell having a first end and a second end opposite the first end, the first end of the first cell received in the first cell receiving recess of the first frame member, and a second frame member having a first cell receiving recess, the second end of the first cell received in the first cell receiving recess of the second frame member.

6. The battery pack of claim 5, wherein the second frame member further includes an adhesive introduction port configured to receive an adhesive therethrough;

an adhesive passage extending at least partially about the first cell receiving recess, the adhesive passage in fluid communication with the adhesive introduction port and with the first cell receiving recess; and a ventilation port in fluid communication with the adhesive passage.

7. The battery pack of claim 6, wherein the second frame member is identical to the first frame member.

8. The battery pack of claim 5, wherein the first frame member further includes a fastener opening, the second frame member further includes a fastener opening, and the battery pack further includes a fastener extending through the fastener opening of the first frame member and the fastener opening of the second frame member.

9. The battery pack of claim 8, wherein the fastener opening of the first frame member is defined in a boss, and the fastener opening of the second frame member is defined in a boss.

10. The battery pack of claim 5, wherein the first frame member and the second frame member are spaced apart such that a portion of the first cell between the first end and the second end is exposed laterally.

11. The battery pack of claim 10, wherein the first frame member and the second frame member are coupled to each other by the first cell.

12. The battery pack of claim 1, wherein
the adhesive introduction port includes a frustoconical shape that is narrowest adjacent the adhesive passage.

13. The battery pack of claim 1, wherein
the ventilation port includes a frustoconical shape that is narrowest adjacent the adhesive passage.

14. The battery pack of claim 1, wherein
the adhesive introduction port and the ventilation port extend generally parallel to each other, and
each of the adhesive introduction port and the ventilation port extends generally perpendicular to the adhesive passage.

15. The battery pack of claim 1, wherein
the first cell receiving recess includes a frustoconical section and a cylindrical section.

16. A battery pack comprising:
a frame member including
a plurality of cell receiving recesses, each cell receiving recess defining a central axis and a sidewall,
a plurality of adhesive introduction ports, each adhesive introduction port corresponding to a respective cell receiving recess,
a plurality of adhesive passages, each adhesive passage extending at least partially about the respective cell receiving recess and having a laterally outermost boundary matching with the sidewall of the respective cell receiving recess, and
a plurality of ventilation ports, each ventilation port in fluid communication with a respective adhesive passage;
a plurality of cells, each cell including a cell end surface received in the respective cell receiving recess and a cell side surface contacting the sidewall of the respective cell receiving recess;
adhesive received in each respective adhesive passage, the adhesive contacting the cell end surface of each respective cell to couple the cell to the frame member;
a strap recess positioned at least partially between the central axis of three adjacent cell receiving recesses, at least a portion of the strap recess positioned outside of a projected perimeter of each of the plurality of cells and extending to the projected perimeters of three adjacent cells of the plurality of cells; and
a connector strap positioned in the strap recess.

17. The battery pack of claim 16, wherein the adhesive passage is an annular passage and the cells are cylindrical cells.

18. The battery pack of claim 16, wherein the adhesive passage is a semi-annular passage and the cells are cylindrical cells.

19. The battery pack of claim 16, wherein
the frame member is a first frame member, and
further comprising a second frame member coupled to the plurality of cells on an opposite end of the cells from the first frame member.

20. The battery pack of claim 19, wherein the first frame member and the second frame member are identical.

21. The battery pack of claim 1, wherein, in a direction parallel to the first central axis, a portion of the strap recess overlaps with a portion of the first cell receiving recess.

22. The battery pack of claim 21, wherein, in a direction parallel to the second central axis, a portion of the strap recess overlaps with a portion of the second cell receiving recess.

23. The battery pack of claim 21, wherein the adhesive introduction port is positioned outside the strap recess.

24. The battery pack of claim 23, wherein the ventilation port is positioned outside the strap recess.

25. The battery pack of claim 24, wherein the adhesive passage is positioned outside the strap recess.

26. The battery pack of claim 16, wherein, in a direction parallel to the central axis, a portion of the strap recess overlaps with a portion of at least one of the plurality of cell receiving recesses.

27. The battery pack of claim 26, wherein at least one of the plurality of adhesive introduction ports is positioned outside the strap recess.

* * * * *